US006843166B1

(12) United States Patent
Li

(10) Patent No.: US 6,843,166 B1
(45) Date of Patent: Jan. 18, 2005

(54) AUTOMATIC COOKING AND VENDING MACHINE

(76) Inventor: Zhengzhong Li, 14-37 139th St., Whitestone, NY (US) 11357

(*) Notice: Subject to any disclaimer, the term of this patent is extended or adjusted under 35 U.S.C. 154(b) by 0 days.

(21) Appl. No.: 10/771,478

(22) Filed: Feb. 4, 2004

(51) Int. Cl.[7] .............................. A23L 1/00; A47J 27/00; A47J 27/14; A47J 36/16; A47J 43/044

(52) U.S. Cl. .............................. 99/327; 99/332; 99/342; 99/348; 99/352; 99/357

(58) Field of Search ................... 99/325–334, 352–355, 99/341, 342, 348, 357, 443 R, 443 C, 485, 486; 426/231–233, 519, 438, 520, 523; 219/490–492, 442, 494, 400, 620, 413, 621, 506, 388; 126/20, 21 A; 366/287, 221; 700/90

(56) References Cited

U.S. PATENT DOCUMENTS

| | | | | |
|---|---|---|---|---|
| 4,503,502 A | * | 3/1985 | Chapin ........................ | 700/90 |
| 4,636,949 A | * | 1/1987 | Longabaugh ................ | 700/90 |
| 4,700,617 A | | 10/1987 | Lee et al. .................... | 99/327 |
| 4,820,054 A | * | 4/1989 | Wong ......................... | 366/287 |
| 4,919,950 A | * | 4/1990 | Mak .......................... | 426/233 |
| 4,942,807 A | * | 7/1990 | Wong ......................... | 99/348 |
| 5,088,390 A | * | 2/1992 | Wong et al. ................. | 99/327 |
| 5,132,914 A | * | 7/1992 | Cahlander et al. .......... | 700/211 |
| 5,172,328 A | * | 12/1992 | Cahlander et al. .......... | 700/211 |
| 5,386,762 A | * | 2/1995 | Gokey ........................ | 99/326 |
| 5,469,782 A | * | 11/1995 | Wong ......................... | 99/644 |
| 5,539,671 A | * | 7/1996 | Albrecht et al. ............ | 700/299 |
| 5,819,636 A | * | 10/1998 | Khashoggi .................. | 99/326 |
| 6,112,645 A | | 9/2000 | Chang ........................ | 99/327 |
| 6,647,864 B1 | * | 11/2003 | Fang .......................... | 99/327 |

* cited by examiner

Primary Examiner—Timothy F. Simone
(74) Attorney, Agent, or Firm—Goldstein Law Offices, P.C.

(57) ABSTRACT

An automatic cooking and vending machine, for preparing, dispensing, and vending a plate of cooked food to a paying customer, comprising a food storage compartment mounted to a rectangular housing. The food is prepared within the housing, under the direction of a computer. Additionally, the customer utilizes the computer to place an order for a particular plate of food. The food storage compartment has a plurality of different food storage containers. The housing encloses two movable cooking pots, a quantity measuring device for measuring and dispensing a precise quantity of different foods into one of the cooking pots, two movable gas burners for heating the food within the cooking pots, and a plate dispensing system for shuttling an empty plate underneath the cooking pot to receive the prepared dish and then, to the customer receiving platform extending from the housing.

19 Claims, 12 Drawing Sheets

AUTOMATIC COOKING AND VENDING MACHINE

BACKGROUND OF THE INVENTION

1. Field of the Invention

The invention generally relates to an automatic cooking machine, and in particular relates to an automatic cooking and vending machine, for preparing, dispensing, and vending a plate of cooked food to a paying customer.

2. Description of the Related Art

Many automatic cooking machines have been devised for cooking stir-fried Chinese dishes. However, such machines are generally intended for use within a kitchen of a restaurant, for enabling an untrained operator to prepare cooked food, and are not intended to dispense or sell cooked food directly to an individual customer. Accordingly, there is a need for an automatic cooking and vending machine, capable of automatically preparing a variety of Chinese foods, and additionally capable of dispensing and selling a plate of the cooked food directly to the customer.

A variety of automatic cooking machines have been devised for facilitating the process of cooking Chinese food. For example, U.S. Pat. No. 4,503,502 to Chapin appears to show an automatic cooking machine having a computer for selecting a particular food from a displayed menu, a plurality of food containers for holding the ingredients for the foods, a wok for frying foods, a spatula assembly for stirring the foods as they fry, and a timer for ensuring that the foods are fried for the proper amount of time.

Additionally, U.S. Pat. No. 4,700,617 to Lee et al appears to show an automatic frying machine having a feeder device for automatically placing food materials into a pan, a frying and stirring device, a mechanism for turning the pan 180 degrees for serving the prepared food, and a washer for cleaning the pan.

Moreover, U.S. Pat. No. 6,112,645 to Chang appears to show an automatic cooking machine having a feeding device, a frying device, a heating device, a server device, a washing device, and a computer for controlling the operation of the aforementioned devices.

While these devices may be suitable for the particular purpose employed, or for general use, they would not be as suitable for the purposes of the present invention as disclosed hereafter.

SUMMARY OF THE INVENTION

It is an object of the invention to provide an automatic cooking and vending machine which is capable of preparing different plates of cooked food. Accordingly, the machine has a housing which encloses two movable cooking pots, a quantity measuring device for measuring and dispensing precise quantities of foods and ingredients into one of the cooking pots, two movable gas burners for heating the food within the cooking pots, and a plate dispensing system for shuttling an empty plate to the cooking pot to receive the cooked food and then, to the customer. The entire cooking process is under the direction of a computer.

It is another object of the invention to produce an automatic cooking and vending machine which is additionally capable of vending the prepared food to a paying customer. Accordingly, the computer, in addition to controlling the cooking process, is provided with an associated touch screen for selectively displaying a menu, a credit card scanning slot for scanning an existing credit card, and a printing slip outlet for printing details of the transaction, said touch screen, credit card scanning slot, and printing slip outlet used by the customer for placing an order for cooked food.

Further objects of the invention will become apparent in the detailed description of the invention which follows.

The invention is an automatic cooking and vending machine, for preparing, dispensing, and vending a plate of cooked food to a paying customer, comprising a food storage compartment mounted to a housing. The food is prepared within the housing, under the direction of a computer. Additionally, the customer utilizes the computer to place an order for a particular plate of food. The food storage compartment has a plurality of different food storage containers. The housing encloses two movable cooking pots, a quantity measuring device for measuring and dispensing a precise quantity of different foods into one of the cooking pots, two movable gas burners for heating the food within the cooking pot in the cooking position, and a plate dispensing system for shuttling an empty plate underneath the cooking pot to receive the prepared dish and then, to the customer receiving platform extending from the housing.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
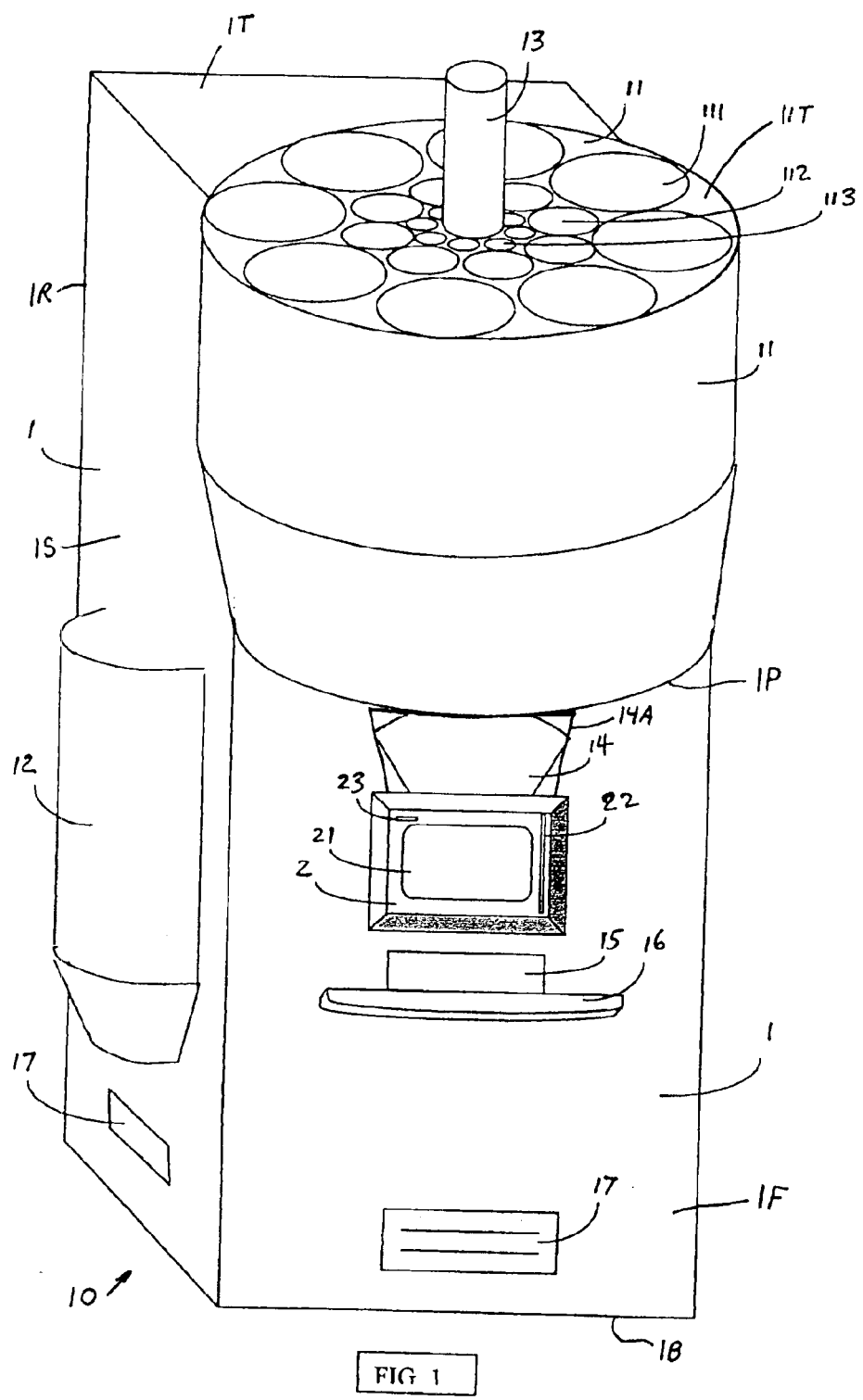
FIG. 1 is a perspective view of a front of an automatic cooking and vending machine, having a housing, a food storage compartment, and a computer for orchestrating the cooking process and for taking orders from a customer.

FIG. 1 illustrates an automatic cooking and vending machine 10, capable of preparing a variety of cooked foods, loading an empty plate with a quantity of cooked food, and dispensing and vending the plate of cooked food to a paying customer. The machine 10 comprises a substantially rectangular housing 1 having an interior 1I, a top 1T, a bottom 1B, two opposing sides 1S, a front 1F, a rear 1R, and a substantially centrally located horizontal platform 1P. The machine 10 has a substantially cylindrical food storage compartment 11, having a top 11T and a bottom 11B. The bottom 11B of the food storage compartment 11 is supported upon the platform 1P. The food storage compartment 11 selectively contains a plurality of different food storage containers 111, 112, and 113, as will be described.

Figure 2:
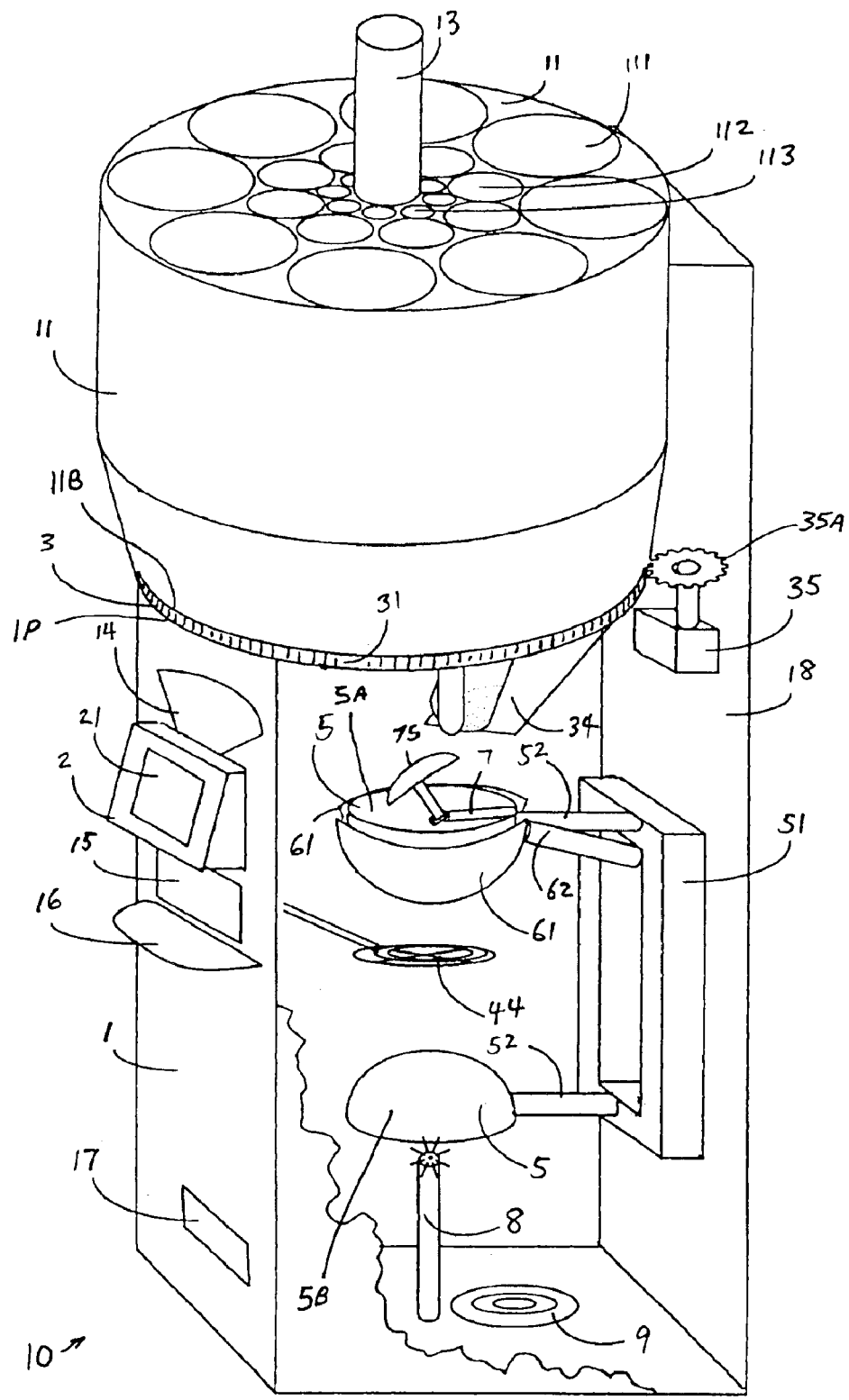
FIG. 2 is a perspective view of the automatic cooking and vending machine, wherein a side of the housing has been removed in order to illustrate a rotatable gear wheel, pots used for cooking, a sprinkler used for washing, a quantity measuring device, and a gear driver assembly.

Turning to FIG. 2, the housing 1 encloses various functional components of the machine 10. In particular, the housing 1 encloses two arcuate gas burners 61, a water sprinkler 8, and a tracking mechanism 51 having two elongated handles 52, each having a substantially hemispherical pot 5 attached thereunto. The gas burners 61 are attached to an existing supply of gas by a metal gas tube 62. The sprinkler 8 is attached to an existing supply of running water. The motorized tracking mechanism 51 shuttles each of the pots 5 from a "cooking position" wherein the pot 5 is sandwiched between the burners 61, to an inverted "washing position" wherein the pot 5 is positioned just above the sprinkler 8, in order to wash the pot 5 with a jet of running water. In FIG. 2, one of the pots 5A is being "cupped" and heated between the two arcuate burners 61, while the other pot 5B has been inverted and is being washed by water issuing from the sprinkler 8.

Figure 5:
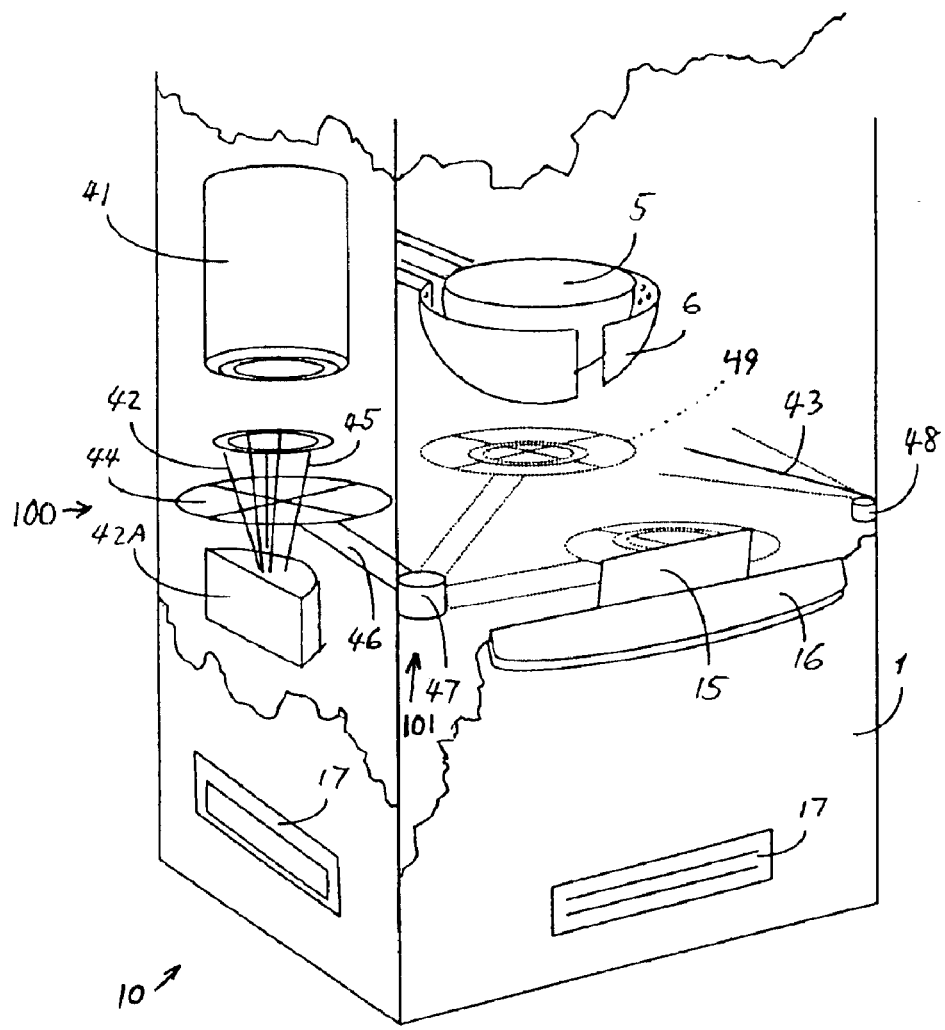
FIG. 5 is a perspective view of the automatic cooking and vending machine, wherein one of the sides and the front of the housing have been broken away in order to show a plate dispenser assembly, one of the cooking pots, the gas heaters, an access door, and a customer receiving platform.

Turning momentarily to FIG. 5, the housing 1 encloses a plate dispensing assembly 100, comprising a cylindrical plate compartment 41 for holding a plurality of empty plates 49, and a plate dispensing mechanism 101 for serving a plate 49 of cooked food to the customer. The housing 1 has an access door 15 and has a receiving platform 16 mounted underneath the access door 15. The access door 15 selectively slides open to dispense the plate 49 of cooked food onto the receiving platform 16, prior to being picked up by the customer. After the plate 49 is moved out of the housing 1, the access door 15 is automatically closed.

The plate dispensing mechanism 101 selectively shuttles an empty plate 49 from the plate compartment 41 to a position underneath the pot 5 which is in the cooking position, for accepting the cooked food therefrom after the pot 5 has been inverted by the tracking mechanism 51. Then, the plate dispensing mechanism 101 shuttles the full plate of food through the access door 15 and onto the receiving platform 16. After the pot 5 has emptied the cooked food onto the plate 49, the tracking mechanism 51 shuttles the pot 5 to the sprinkler 8 for washing.

Returning to FIG. 1, the machine 10 has a computer 2 for controlling all of the components of the machine 10. The computer 2 has an associated touch screen 21, a credit card scanning slot 22, and a printing slip outlet 23. A portion of the computer 2 and the touch screen 21 partially extend from the front 1F of the housing 1. The touch screen 21, the credit card scanning slot 22, and the printing slip outlet 23 are used by the customer for placing an order for cooked food. In particular, the customer inserts an existing credit card into the credit card scanning slot 22, and activates the screen 21 by touching the screen 21 with his/her fingers. The credit card scanning slot may be configured to additionally accept an existing credit/debit card. Upon activation of the screen 21, a menu is displayed upon the screen 21. The user touches the portion of the screen 21 having either a written or pictorial description of the particular item of food wanted by the customer, in order to place an order for that particular item. The price is calculated by the computer 2 and then shown on the screen 21 and simultaneously printed by the printing slip outlet 23 for the customer to pay either by credit card, credit/debit card, or by cash at a cashier counter. The computer 2 has a hone extending therefrom for communicating with a credit card company. The customer also pays the bill via interaction with the screen 21. The cost of the prepared food is automatically deducted from the customer's credit card account. The printing slip outlet 23 furnishes a receipt having details of the particular transaction, and may be retained by the customer or discarded. An embodiment of the machine 10 wherein a customer may place an order for a plate of food without paying for the food is also contemplated. Such an embodiment might be used at conventions, meetings, and the like, where the primary goal is to rapidly dispense food, and where accepting payment for each individual order is not desired.

It is contemplated that the computer 2 will be provided with a plurality slots for accepting floppy disks and CDs having various menus and application programs. It is additionally contemplated that the computer 2 may be provided with an associated keyboard as an alternate method of inputting orders for cooked food into the computer 2.

The food storage compartment 11 selectively contains a plurality of substantially cylindrical food storage containers. In particular, the food storage compartment 11 contains a plurality of vegetable storage containers 111, meat storage containers 112, and ingredient storage containers 113. Food from the food storage containers 111, 112, and 113 are selectively emptied into the pot 5 which is in the cooking position, as will be described.

The automatic cooking and vending machine 10 has a cylindrical chimney 13 extending from the interior 1I of the housing 1 vertically upward through the center of the cylindrical food storage compartment 11. The chimney 13 exhausts waste gases produced within the interior 1I of the housing 1 during the cooking process. The chimney 13 is covered with heat insulating materials, in order to prevent transmission of heat from the chimney 13 to the adjacent ingredient storage containers 113. The chimney 13 is described in greater detail hereinafter.

Returning to FIG. 2, the machine 10 has a rotatable gear wheel 3 interposed between the bottom 11B of the food storage compartment 11 and the platform 1P. The rotatable gear wheel 3 is supported upon a plurality of ball bearings in order to allow it to easily rotate. The rear 1R of the housing 1 has a surface facing onto the interior of the housing 1, having a gear driving assembly 35 having a gear 35A having teeth attached thereunto. The gear wheel 3 has a peripheral edge having a plurality of teeth 31. The teeth of the gear 35A engage the teeth of the gear wheel 3, thereby causing the gear wheel 3 to selectively rotate under the direction of the computer 2.

The gear wheel 3 has a top surface 3T and a bottom surface 3B. The bottom surface 3B has a quantity measuring device 34 attached thereunto. The quantity measuring device 34 is used for measuring precise quantities of different foods from the food storage compartment 11 prior to the release of the foods into the cooking pot 5 in the cooking position. After the customer utilizes the computer 2 to input an order for a particular plate of cooked food, the computer 2 directs the quantity measuring device 34 to measure out the requisite quantities of different foods into the cooking pot 5, following selective activation of the burners 61. In one embodiment of the invention, the quantity measuring device 34 may be a weighing scale for measuring a particular mass of food to be added to a pot 5 for cooking. Alternately, the measure of quantity may be by volume, as opposed to by mass.

Figure 4A:
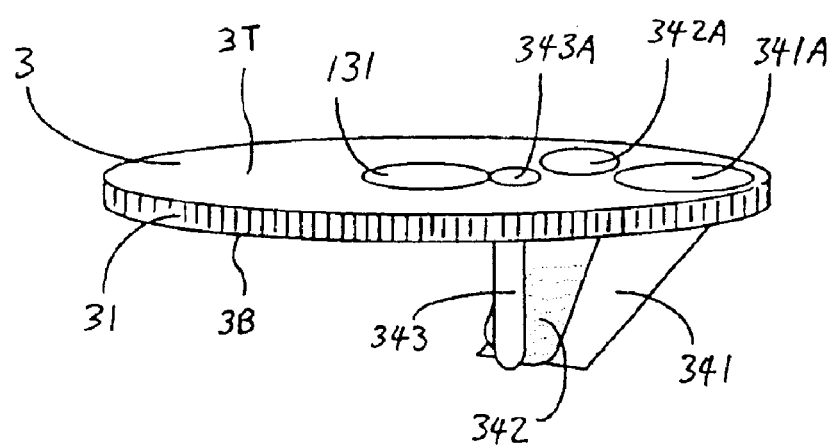
FIG. 4A is a perspective view of the rotatable gear wheel, having openings for the various food storage containers, an attached quantity measuring device, and attached conveyor tubes.

Turning to FIG. 4A, the bottom surface 3B of the gear wheel 3 has a vegetable conveyor tube 341, a meat conveyor tube 342, and an ingredients conveyor tube 343 extending downwardly therefrom. The quantity measuring device 34 is in communication with the vegetable conveyor tube 341, the meat conveyor tube 342, and the ingredients conveyor tube 343. Each of the substantially hollow conveyor tubes 341, 342, and 343, has a top having an opening and has a bottom having an opening. Vegetables, meat, and ingredients are selectively conduited from the vegetable storage containers 111, the meat storage containers 112 and the ingredient storage containers 113, respectively, through the conveyor tubes 341, 342, and 343, respectively, into the first cooking pot 5A, selectively positioned in the cooking position. The particular sequence of adding various foods, and the particular time at which these foods are added, are determined by the computer 2. The vegetable conveyor tube 341 and the meat conveyor tube 342 are tilted toward the center of the gear wheel 3, in order to ensure that the vegetables and meat are directed into the cooking pot 5.

Figure 6:
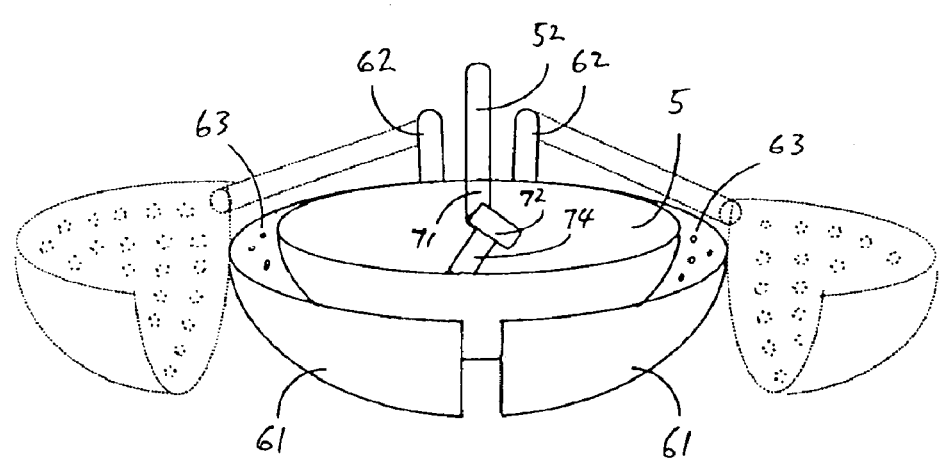
FIG. 6 is a perspective view of the gas burners surrounding one of the pots.

FIG. 6 illustrates the gas burners 61 in greater detail. After a particular order of food has finished cooking, the metal gas tubes 62 move at an angle, thereby turning the gas burners 61 away from the cooking pot 5A sandwiched between the burners 61. Then, the handle 52 of the pot 5 is partially rotated by the tracking assembly 51, in order to empty the cooked food within the pot 5 onto an empty plate 49 carried by the plate dispenser mechanism 101. Then, the handle 52 and the attached pot 5 are moved by the tracking mechanism 51 to the sprinkler 8, where the pot 5 is washed. Simultaneously, the tracking mechanism 51 moves the second cooking pot 5B away from the sprinkler 8 and towards the gas burners 61.

The front 1F of the housing 1 has a transparent window 14A located between the food storage compartment 11 and the computer 2, for allowing the customer to view the cooking process. The window 14A has an associated windshield wiper 14 for wiping the window 14A. The windshield wiper 14 is mounted inside the housing 1 to wipe away steam from the window 14A so that customers may view the cooking process through the window 14A.

The bottom 1B of the housing 1 has a drain 9 for selectively draining away the water produced within the housing 1 by the sprinkler 8, and also for draining away any food which has accidentally fallen to the bottom 1B of the housing 1. It is contemplated that the drain may be provided with an associated blade, for chopping any particulate matter prior to conduiting the waste to an existing drainage system. It is also contemplated that the drain may lead into a U-shaped drainpipe, capable of preventing odors from entering the housing 1 from the drainage system.

Figure 3A:
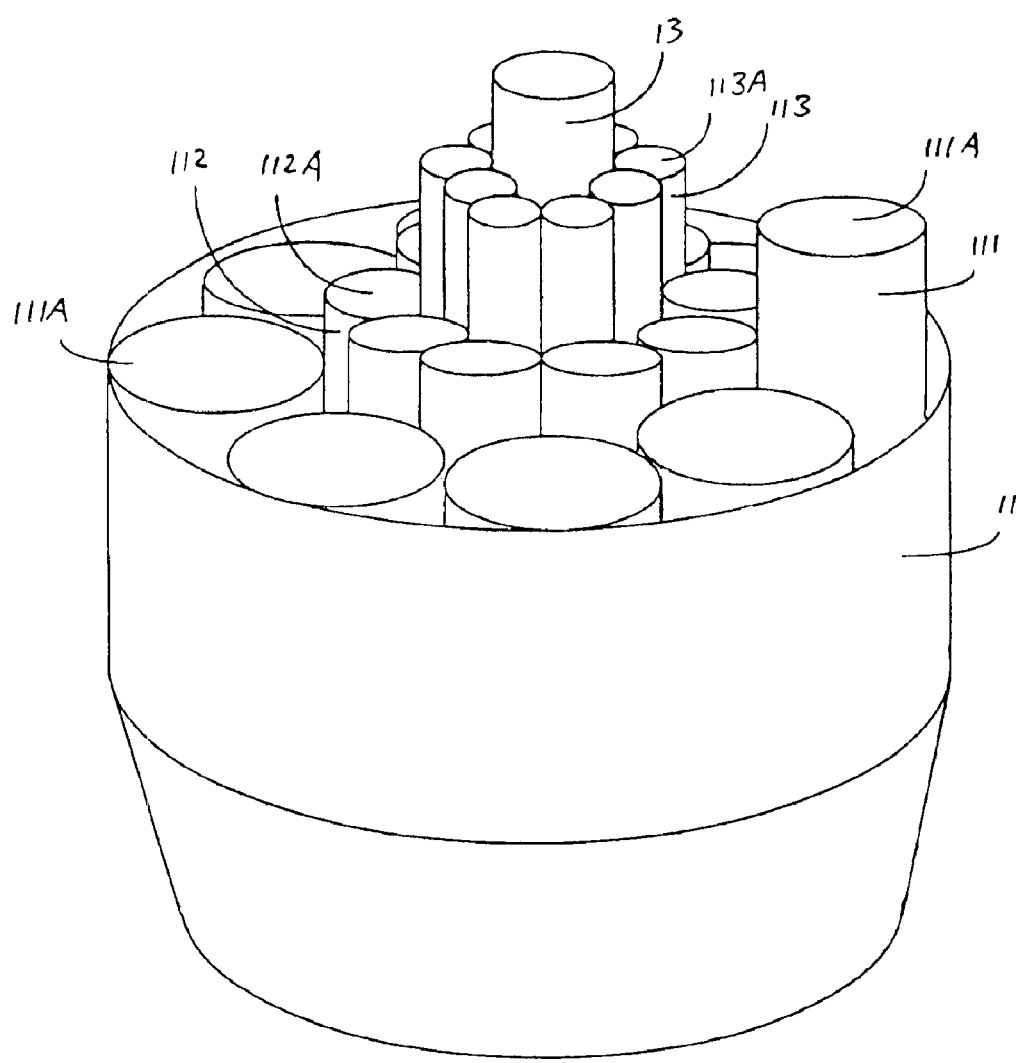
FIG. 3A is an enlarged perspective view of the food storage compartment holding a plurality of food storage containers, wherein several of the food storage containers have been partially extended from the food storage compartment.

FIG. 3A illustrates the plurality of substantially cylindrical vegetable storage containers 111, meat storage containers 112, and ingredient storage containers 113 contained within the food storage compartment 11. Several of the containers 111, 112, and 113 have been partially extended from the food storage compartment 11. The storage containers 111, 112, and 113 are transparent, thereby allowing the quantity of food remaining in each of the containers 111, 112, and 113 to be visually determined by an individual charged with maintaining the machine 10 in working condition. The storage containers 111, 112, and 113 each have a top, 111A, 112A, and 113A, respectively. Each of the tops, 111A, 112A, and 113A may be selectively opened to fill the storage containers 111, 112, and 113, respectively. Turning momentarily to FIG. 4A, the gear wheel 3 has openings 341A, 342A, and 343A extending fully therethrough, in order that food may be conduited from the various food storage containers 111, 112, and 113, through said openings 341A, 342A, and 343A and into the appropriate conveyor tubes 341, 342, and 343, respectively. Each of the substantially cylindrical storage containers 111, 112, and 113 has a bottom which is selectively positioned above the opening 341A, 342A, and 343A, respectively, above the conveyor tubes 341, 342, and 343, respectively, when food from the storage containers 111, 112, and 113 is selectively emptied into the cooking pot 5. Under the instruction and control of the computer 2, the gear wheel 3 selectively rotates and stops at a plurality of different positions, in order that the openings 341A, 342A, and 343A extending through the gear wheel 3 will be selectively positioned directly below the containers 111, 112, and 113, respectively, in order to allow the requested vegetables, meat, or ingredients to enter the conveyor tubes 341, 342 or 343, respectively. It is additionally contemplated that each of the storage containers 111, 112, and 113 may be provided with a shutter at its bottom, which selectively opens in order to allow food or ingredients to empty from the storage containers 111, 112, and 113.

The storage containers 111, 112, and 113 are arranged around the chimney 13 in three concentric rings, namely, an innermost ring, a middlemost ring, and an outermost ring. The innermost ring comprises a plurality of ingredient storage containers 113. The middlemost ring comprises a plurality of meat storage containers 112. The outermost ring comprises a plurality of vegetable storage containers 111. The storage containers 111, 112 and 113 are selectively removable from the food storage compartment 11 in order that they may be replaced or refilled when they have been substantially depleted of their contents.

Figure 3B:
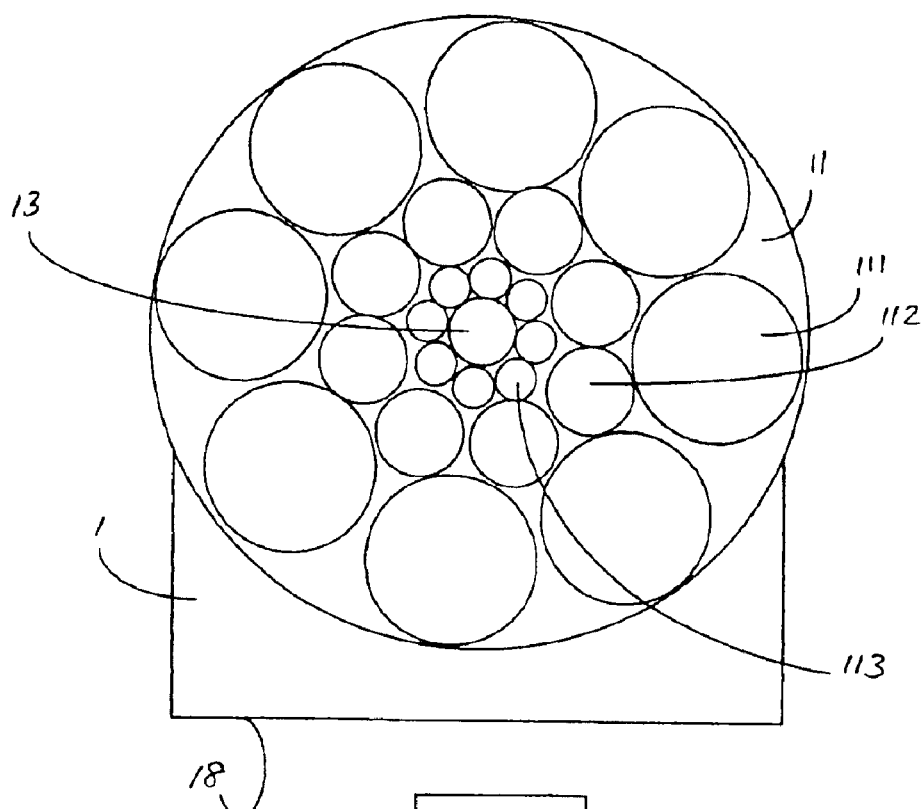
FIG. 3B is a top elevational view of the automatic cooking and vending machine.

Turning to FIG. 3B, the diameter of the ingredient storage containers 113 is preferably smaller than the diameter of the meat storage containers 112, which, in turn, are smaller than the diameter of the vegetable storage containers 111, in order to reflect the different quantities of each of these foods that is typically required in preparing cooked food. The storage containers 112 are linked together in a ring so that they can be moved together. Similarly, the storage containers 113 are linked together in a ring so that they can be moved together.

The chimney 13 extends concentrically through the center of the food storage compartment 11, from the bottom 11B to the top 11T of the food storage compartment 11.

Figure 3C:
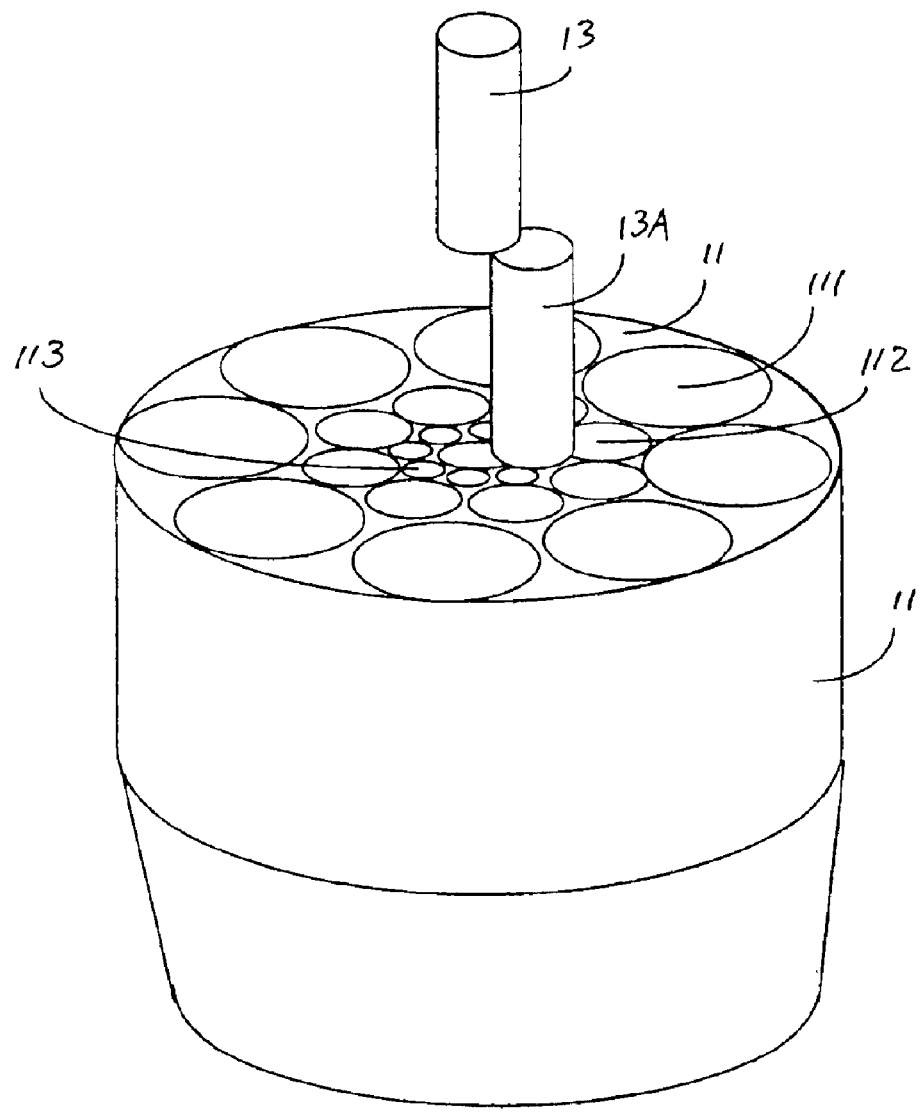
FIG. 3C is a perspective view of the food storage compartment wherein a segment of the chimney has been repositioned, in order to allow the various food storage containers to be easily accessed.

FIG. 3C illustrates the chimney 13 in greater detail. The chimney 13 has a segment 13A extending vertically upward from the top 11T of the food compartment 11 which is capable of being selectively moved, in order to allow ready access to the various storage containers 111, 112, and 113, in order that they may be refilled or replaced. After the storage containers 111, 112, and 113 are refilled and replaced within the food compartment 11, the chimney segment 13A is reattached to the rest of the chimney 13.

Figure 4B:
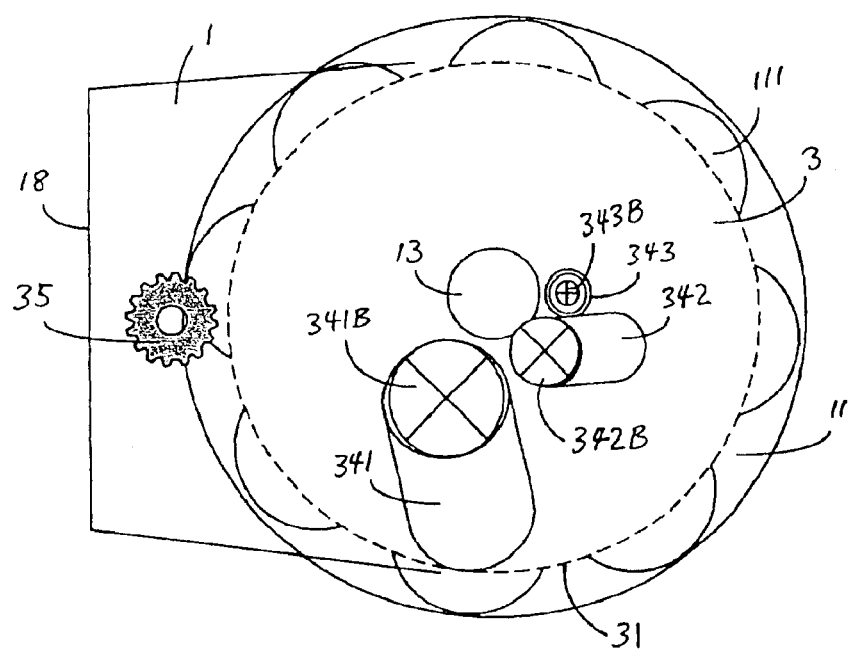
FIG. 4B is a bottom elevational view of the rotatable gear wheel, showing the conveyor tubes and their associated shutters, the gear driver assembly, and the rear of the housing.

FIG. 4B is a bottom view of the rotatable gear wheel 3. The bottom of each of the conveyor tubes 341, 342 or 343 has a shutter, 341B, 342B, 343B, respectively. The shutters 341B, 342B, 343B selectively open, at the same time or at different times, in order to release a quantity of food from the storage containers 111, 112, and 113, respectively, into the cooking pot 5 at the programmed time. The gear wheel 3 additionally insulates the food storage compartment 11 from heat produced within the housing 1.

Returning to FIG. 5, the plate dispenser mechanism 101 will now be described in greater detail. The plate dispenser mechanism 101 has a mechanical hand 42 having an associated motor 42A, mechanical fingers 45, a mechanical arm 43, a motor 48 associated with mechanical arm 43, and a lattice board 44 for selectively supporting one of the plates 49. Initially, the mechanical hand 42 is positioned under the lattice board 44 at a position underneath the plate storage cylinder 41. Upon instruction by the computer, the mechanical hand 42 rises up, driven by the motor 42A, through the lattice board 44 to reach the plate storage cylinder 41, tightens the fingers 45 to get hold of one of the plates 49, and pulls the plate 49 down to the surface of the lattice board 44. Subsequently, the fingers 45 are loosened, and the mechanical hand 42 is lowered to a position below the lattice board 44. The lattice board 44 is at the same horizontal level as the customer receiving platform 16. The lattice board 44 has an elongated lattice board arm 46 which attaches the lattice board 44 to a motor 47, in order that the lattice board 44, carrying the empty plate 49, may be selectively moved from a position underneath the plate storage cylinder 41 to a position underneath the pot 5 in the cooking position, so that it may accept the cooked food within the cooking pot 5. After the cooked food has been loaded onto the plate 49, the lattice board 44 is moved to the position adjacent to the access door 15, the access door 15 slides open, and the mechanical arm 43, driven by the motor 48, moves the loaded plate 49 out of the housing 1 and onto the receiving platform 16. Then, the mechanical arm 43 moves back to its initial position, the access door 15 closes, and the lattice board arm 46 returns the lattice board 44 to its initial position underneath the plate storage cylinder 41, where it is ready to accept an empty plate 49 for the next order of food.

FIG. 6 illustrates the two gas burners 61, each extending from a gas tube 62, and each having a plurality of small holes 63 for releasing gas. The gas burners 61 are moved in proximity to the cooking pot 5 when heating of the contents of the pot 5 is required. When cooking is completed, the gas burners 61 are moved away from the cooking pot 5 in a downward angle to allow the cooking pot 5 to turn sideways to empty the contents of the pot 5 onto the empty plate 49, prior to moving to the washing position.

Figure 7A:
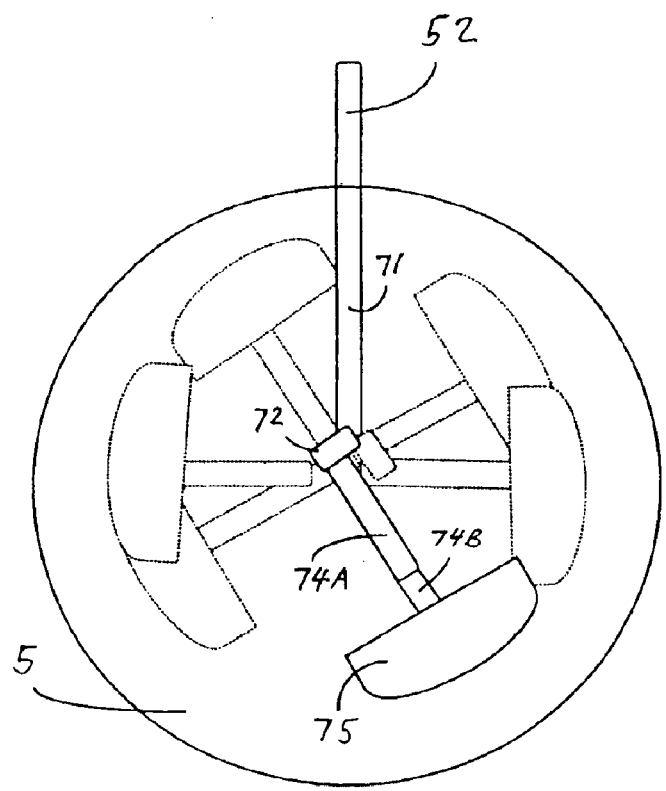
FIG. 7A is a top elevational view of one of the stirrer assemblies after it has been selectively extended into one of the pots.
Figure 7B:
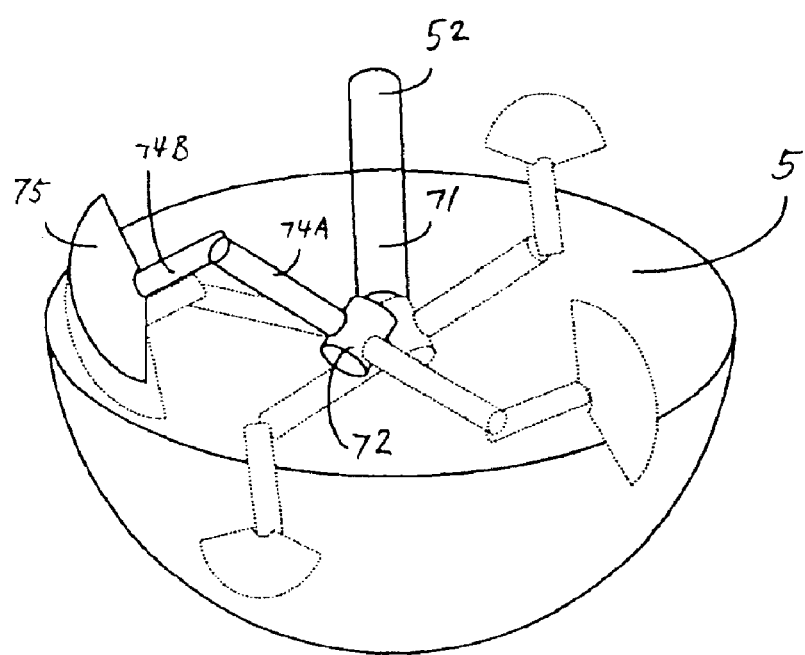
FIG. 7B is a perspective view of one of the stirrer assemblies after it has been selectively extended into one of the pots.
Figure 7C:
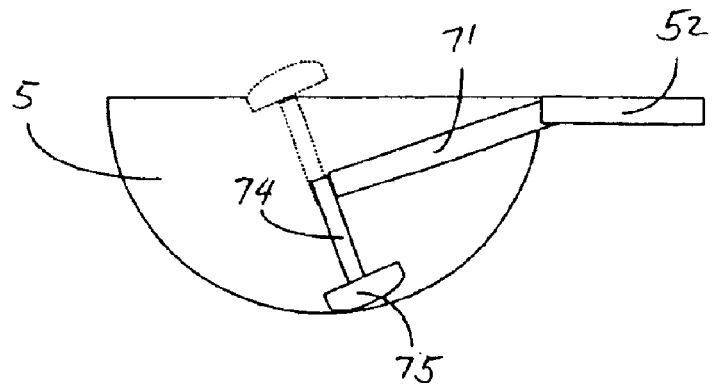
FIG. 7C is a side view of one of the stirrer assemblies after it has been selectively extended into one of the pots, wherein portions of the pot have been broken away.
Figure 7D:
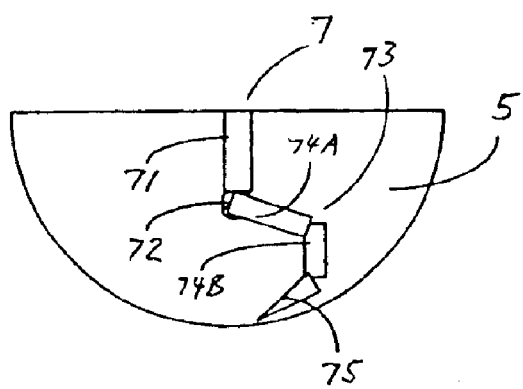
FIG. 7D is a front view of the stirrer assembly after it has been selectively extended into one of the pots, wherein portions of the pot have been broken away.

Turning to FIG. 7B, the machine 10 additionally has two stirrer assemblies 7, each having a portion which selectively extends into a different one of the two cooking pots 5, in order to stir and mix the food while it is cooking so that the food is uniformly cooked. Each stirrer assembly 7 comprises a handle 52, a long rod 71, a short rod 72, a spatula 73 having a spatula handle 74 and a blade 75. The spatula 73 turns the vegetables and meat upside down in the cooking pot 5 in order to ensure uniform cooking. As illustrated in both FIG. 7B and FIG. 7C, during the process of cooking, the long rod 71 transfers rotation from the handle 52, through the small rod 72, and to the blade 75, so that the blade 75 turns around, up, and down inside the cooking pot 5. Meanwhile, as illustrated in FIG. 7A and FIG. 7B, the small rod 72 sways sideward in a 90 degree angle, thereby making the blade 75 turn around, up, and down from different directions, so that all the food in the cooking pot 5 can be stirred by the spatula 73. The selectively angled spatula handle 74 has an innermost portion 74A and an outermost portion 74B. As illustrated in FIG. 7D, the blade 75 is hingeably attached to the outermost portion 74B of the spatula handle 74B, in order that the blade 75 will mimic the motion of the hands of a human chef, and thereby more efficiently stir the contents of the pot 5. The long rod 71 tilts downward into the center of the cooking pot 5 in order to ensure the spatula 73 does not spread vegetables, meat and ingredients out of the cooking pot 5.

The bottom 1B of the housing 1 has a plurality of ventilation windows 17 extending fully therethrough, for allowing air to enter the interior 1I of the housing 1. It is contemplated that the ventilating windows may be provided with air filters.

In use, a customer places an order by inserting a credit card into the credit card scanning slot 22, and by using the touch screen 21 of the computer 2 to request a plate 49 of cooked food from the menu. The computer 2 automatically deducts the cost of the food from the credit card. The computer 2 directs the tracking mechanism 51 to position a pot 5 between the burners 61. The gas burners 61 are selectively activated to heat the pot 5. The computer 2 directs the gear wheel 3 to rotate to a position wherein an appropriate opening 341A, 342A, or 343A of the gear wheel 3 is positioned below an appropriate food container 111, 112, or 113, respectively. The quantity measuring device 34 measures out the requisite quantities of meat, vegetables, and ingredients from the food containers 111, 112, or 113, as called for by the recipe for the cooked food which has been requested. The shutters 341B, 342B, and 343B at the bottom of the conveyor tubes 341, 342, and 343, respectively, open to release said quantities of food into the cooking pot 5. The stirrer assembly 7 uniformly stirs the food within the pot 5 as it is cooking. After the food has been cooked, the plate dispenser mechanism 101 positions an empty plate 49 underneath the cooking pot 5 for accepting the cooked food thereupon. The plate dispenser mechanism 101 then moves the plate 49 out of the access door 15 and onto the receiving platform 16, for receipt by the customer. The pot 5 which has been used for cooking is now moved by the tracking mechanism 51 to an inverted position above the sprinkler 8, where it is washed subsequent to being used once again for cooking. As the pot 5A which has been used for cooking moves downward to be washed, the other pot 5B moves upward to a location in proximity to the burners 61, where it is ready to be used as the next cooking pot 5.

In conclusion, herein is presented an automatic cooking and vending machine, for preparing, dispensing, and vending a plurality of different types of food. The invention is illustrated by example in the drawing figures, and throughout the written description. It should be understood that numerous variations are possible, while adhering to the inventive concept. Such variations are contemplated as being a part of the present invention.

What is claimed is:
1. An automatic cooking and vending machine, for preparing, dispensing, and vending a plate of cooked food to a paying customer who has placed an order for a plate of cooked food, comprising:
- a housing having an interior, a top, a bottom, two opposing sides, a front, a rear, and a substantially centrally located horizontal platform, said housing having an access door which opens to dispense the plate of cooked food to the customer, said housing enclosing:
- two gas burners;
- a water sprinkler;
- a motorized tracking mechanism having two handles, each having a substantially hemispherical pot attached thereunto, for shuttling each of the pots from a cooking position wherein the pot is sandwiched between the burners, to an inverted washing position wherein the pot is positioned just above the sprinkler;
- a plate dispensing assembly, comprising a plate compartment for holding a plurality of empty plates, and a plate dispensing mechanism for shuttling an empty plate from the plate compartment to a position underneath the pot which is in the cooking position, for accepting the cooked food therefrom after the pot has been inverted by the tracking mechanism, and then, through the access door;
- a quantity measuring device for measuring quantities of different foods prior to the release of the foods into the cooking pot in the cooking position;
- a stirrer assembly, which extends into each of the cooking pots, for stirring the food while it is cooking; and
- a computer for controlling all of the components of the machine, said computer having an associated touch screen for selectively displaying a menu and for placing the order for cooked food, a credit card scanning slot for scanning an existing credit card to pay for the order, and a printing slip outlet for printing details of the order; and
- a food storage compartment, having a top and a bottom, wherein the bottom of the food storage compartment is supported upon the platform, said food storage compartment for selectively containing a plurality of different food storage containers, each of which contains food which is selectively emptied into the pot in the cooking position.

2. The automatic cooking and vending machine as recited in claim 1, wherein the front of the housing has a transparent window for allowing the customer to view the cooking process.

3. The automatic cooking and vending machine as recited in claim 2, wherein one of the pots is capable of being selectively washed, even as the other pot is being used for cooking food.

4. The automatic cooking and vending machine as recited in claim 3, wherein the machine has a rotatable gear wheel interposed between the bottom of the food storage compartment and the platform, wherein said gear wheel selectively rotates under the direction of the computer, wherein the gear wheel has a top surface and a bottom surface, wherein the quantity measuring device is attached to the bottom surface of the gear wheel, and wherein the bottom surface of the gear wheel has conveyor tubes extending downwardly therefrom, for directing food from the food storage containers into the cooking pot selectively positioned between the burners.

5. The automatic cooking and vending machine as recited in claim 4, wherein the gear wheel has openings extending fully therethrough for conduiting food from the various food storage containers into the conveyor tubes, wherein each of the storage containers has a bottom which is selectively positioned above one of the openings in order to allow food from the storage containers to be emptied into the cooking pot, and wherein under the direction of the computer, the gear wheel selectively rotates and stops at a plurality of different positions, in order that the openings extending through the gear wheel will be selectively positioned directly below the food containers, in order to allow the requested foods to enter the conveyor tubes.

6. The automatic cooking and vending machine as recited in claim 5, wherein the plate dispenser mechanism has a mechanical hand having an associated motor, mechanical fingers, a mechanical arm, a motor associated with mechanical arm, and a lattice board for selectively supporting one of the plates, wherein initially, the mechanical hand is positioned under the lattice board at a position underneath the plate storage cylinder, and wherein upon instruction by the computer, the mechanical hand rises up, driven by the motor, through the lattice board to reach the plate storage cylinder, tightens the fingers to get hold of one of the plates, and pulls the plate down to the surface of the lattice board, and wherein subsequently, the fingers are loosened, and the mechanical hand is lowered to a position below the lattice board.

7. The automatic cooking and vending machine as recited in claim 6, wherein the lattice board has an elongated lattice board arm which attaches the lattice board to a motor, for moving the lattice board to the plate dispenser for receiving an empty plate, to the cooking pot for filling the empty plate with cooked food, and to the access door for dispensing the plate of cooked food to the customer.

8. The automatic cooking and vending machine as recited in claim 7, further comprising a chimney extending from the interior of the housing for exhausting waste gases produced during the cooking process.

9. The automatic cooking and vending machine as recited in claim 8, wherein the bottom of each of the conveyor tubes has a shutter capable of selectively opening in order to release a quantity of food from the storage containers into the cooking pot.

10. The automatic cooking and vending machine as recited in claim 9, wherein the bottom of the housing has a drain for selectively draining away the water produced within the housing by the sprinkler.

11. The automatic cooking and vending machine as recited in claim 10, wherein the window has an associated windshield wiper mounted inside the housing for wiping the window.

12. The automatic cooking and vending machine as recited in claim 11, wherein the storage containers are transparent, thereby allowing the quantity of food remaining in each of the containers to be visually determined, and wherein the storage containers each have a top which may be selectively opened to fill the storage containers.

13. The automatic cooking and vending machine as recited in claim 12, wherein the storage containers are selectively removable from the food storage compartment in order that they may be replaced or refilled when they have been substantially depleted of their contents.

14. The automatic cooking and vending machine as recited in claim 13, wherein the chimney extends concentrically through the center of the food storage compartment, from the bottom to the top of the food storage compartment.

15. The automatic cooking and vending machine as recited in claim 14, wherein the chimney has a segment extending vertically upward from the top of the food compartment which is capable of being selectively moved, in order to allow ready access to the various storage containers, in order that they may be refilled or replaced.

16. The automatic cooking and vending machine as recited in claim 15, wherein the gas burners are moved in proximity to the cooking pot when heating of the contents of the pot is required, and wherein when cooking is completed, the gas burners are moved away from the cooking pot in a downward angle to allow the cooking pot to turn sideways to empty the contents of the pot onto the empty plate, prior to moving to the washing position.

17. The automatic cooking and vending machine as recited in claim 16, wherein the stirrer assembly comprises a long rod, a short rod, a spatula handle, and a spatula blade, wherein the spatula blade turns the food upside down in the cooking pot in order to ensure uniform cooking.

18. The automatic cooking and vending machine as recited in claim 17, wherein, during the process of cooking, the long rod transfers rotation from the handle, through the small rod, and to the blade, so that the blade turns inside the cooking pot, as the small rod sways sideward in a 90 degree angle, so that all the food in the cooking pot can be stirred by the spatula, wherein the selectively angled spatula handle has an innermost portion and an outermost portion, wherein the blade is hingeably attached to the outermost portion of the spatula handle, and wherein the long rod tilts downward into the center of the cooking pot in order to ensure the spatula does not spread vegetables, meat and ingredients out of the cooking pot.

19. The automatic cooking and vending machine as recited in claim 17, wherein the bottom of the housing has a plurality of ventilation windows extending fully therethrough, for allowing air to enter the interior of the housing.

* * * * *